US012640471B2

(12) United States Patent
So et al.

(10) Patent No.: US 12,640,471 B2
(45) Date of Patent: May 26, 2026

(54) QUADRI-POLARIZATION DIVERSITY ANTENNA SYSTEM

(71) Applicant: KMW INC., Hwaseong-si (KR)

(72) Inventors: Sung Hwan So, Hwaseong-si (KR); Oh Seog Choi, Hwaseong-si (KR); Hun Jung Jung, Hwaseong-si (KR); Yong Won Seo, Hwaseong-si (KR); Gyo Jin Jo, Yongin-si (KR); Soo Bean Cho, Gwangju-si (KR)

(73) Assignee: KMW INC., Hwaseong-si (KR)

( * ) Notice: Subject to any disclaimer, the term of this patent is extended or adjusted under 35 U.S.C. 154(b) by 40 days.

(21) Appl. No.: 18/617,651

(22) Filed: Mar. 27, 2024

(65) Prior Publication Data

US 2024/0243471 A1 Jul. 18, 2024

Related U.S. Application Data

(63) Continuation of application No. PCT/KR2022/013147, filed on Sep. 1, 2022.

(30) Foreign Application Priority Data

Sep. 27, 2021 (KR) ........................ 10-2021-0127532
Aug. 31, 2022 (KR) ........................ 10-2022-0110163

(51) Int. Cl.
*H01Q 3/38* (2006.01)
*H01Q 3/26* (2006.01)
*H01Q 21/24* (2006.01)

(52) U.S. Cl.
CPC ............. *H01Q 3/38* (2013.01); *H01Q 3/2605* (2013.01)

(58) Field of Classification Search
CPC .......... H01Q 1/246; H01Q 21/24; H01Q 3/26; H01Q 3/36; H01Q 25/001; H01Q 15/242;
(Continued)

(56) References Cited

U.S. PATENT DOCUMENTS 6,768,456 B1 * 7/2004 Lalezari ............... H01Q 21/205 342/373
6,850,130 B1 * 2/2005 Gottl ........................ H01Q 3/32 333/156

(Continued)

FOREIGN PATENT DOCUMENTS

CN 1599138 A 3/2005
CN 2727987 Y 9/2005

(Continued)

OTHER PUBLICATIONS

Publisher:CN1599138 Mar. 23, 2005, Title: Four-polarization six-sector array omnidirectional antenna, pp. 1-19, Author: Jiang Xingyong (Year: 2005).*

(Continued)

*Primary Examiner* — Wei (Victor) Y Chan

(57) ABSTRACT

A quadri-polarization diversity antenna system is disclosed. According to embodiments of the present disclosure, an antenna system includes an antenna array including a first column of dual-polarized antenna units and a second column of dual-polarized antenna units. Each of the dual-polarized antenna units includes a first antenna element and a second antenna element perpendicularly crossing each other. In each column, the first antenna elements are conductively connected to form a first subarray and the second antenna elements are conductively connected to form a second subarray. The antenna system further includes an RF matrix that selectively adjusts phases of RF input signals to generate RF output signals provided to the subarrays. When the RF output signals are radiated by the dual-polarized antenna units, a first beam with +/−45° polarizations and a second beam with 0°/90° polarizations are formed, and the first beam and the second beam are formed toward spatially different directions from each other.

8 Claims, 15 Drawing Sheets

(58) Field of Classification Search
CPC .......... H01Q 25/00; H01Q 3/40; H01Q 21/22; H01Q 1/288; H01Q 1/27; H01Q 21/08
See application file for complete search history.

(56) References Cited

U.S. PATENT DOCUMENTS

| | | | | |
|---|---|---|---|---|
| 2003/0073463 | A1* | 4/2003 | Shapira | H04B 1/40 455/562.1 |
| 2004/0038714 | A1* | 2/2004 | Rhodes | H01Q 3/32 455/562.1 |
| 2004/0090286 | A1* | 5/2004 | Runyon | H01P 5/04 333/117 |
| 2004/0160361 | A1* | 8/2004 | Izzat | H01Q 3/40 342/360 |
| 2005/0030249 | A1* | 2/2005 | Gabriel | H01Q 3/32 343/820 |
| 2010/0283703 | A1 | 11/2010 | Chen | |
| 2012/0007789 | A1 | 1/2012 | Petersson et al. | |
| 2021/0029556 | A1 | 1/2021 | Wu et al. | |

FOREIGN PATENT DOCUMENTS

| | | | |
|---|---|---|---|
| KR | 10-2013-0070560 | A | 6/2013 |
| KR | 10-2021-0070887 | A | 6/2021 |
| KR | 10-2021-0093136 | A1 | 7/2021 |

OTHER PUBLICATIONS

Publisher:CN1599138 Mar. 23, 2005, Title: Four-polarization six-sector array omnidirectional antenna, pp. 1-19, Author: Jiang Xingyong (Translation) (Year: 2005).*

International Search Report mailed Dec. 23, 2022 for International Application No. PCT/KR2022/013147 and its English translation.

Office Action mailed on Jul. 23, 2025 from United States Patent and Trademark Office for U.S. Appl. No. 18/616,263.

* cited by examiner

| Polarization | Signal |
|---|---|
| +45° | T1 |
| −45° | T2 |
| V | T3 |
| H | T4 |

| Polarization | Signal |
|---|---|
| +45° | T1 |
| −45° | T2 |
| H | T3 |
| V | T4 |

| Input signal (target polarization) | | Output phase table | | | |
|---|---|---|---|---|---|
| | | C1 +45 | C1 −45 | C2 +45 | C2 −45 |
| T1 (+45) | Beamforming (A) | 0 | − | −90 | − |
| | Pol (B) | − | − | − | − |
| | Total (A)+(B) | 0 | − | −90 | − |
| T2 (−45) | Beamforming (A) | − | 0 | − | −90 |
| | Pol (B) | − | − | − | − |
| | Total (A)+(B) | − | 0 | − | −90 |
| T3 (H) | Beamforming (A) | 0 | 0 | 90 | 90 |
| | Pol (B) | 0 | 180 | 0 | 180 |
| | Total (A)+(B) | 0 | 180 | 90 | 270 |
| T4 (V) | Beamforming (A) | 0 | 0 | 90 | 90 |
| | Pol (B) | 0 | 0 | 0 | 0 |
| | Total (A)+(B) | 0 | 0 | 90 | 90 |

*FIG. 4c*

| Polarization | Signal |
|---|---|
| +45° | T1 |
| −45° | T2 |
| H | T3 |
| V | T4 |

(a)

(b)

(a)

(b)

QUADRI-POLARIZATION DIVERSITY ANTENNA SYSTEM

TECHNICAL FIELD

The present disclosure relates to a quadri-polarization diversity antenna system that can increase a channel capacity of a system to improve the orthogonality of a wireless channel by adjusting the polarization of beams so that spatially adjacent beams have different dual-polarization characteristics.

BACKGROUND

The content described in this section simply provides background information about the present disclosure and does not constitute the prior art.

The polarization of an antenna refers to the direction of an electric field (E-plane) of radio waves relative to the Earth's surface and is determined at least in part by a physical structure and orientation of an antenna element. For example, a simple straight antenna element has one polarization when mounted vertically and a different polarization when mounted horizontally. Although a magnetic field and an electric field of a radio wave are perpendicular to each other, the polarization of an antenna element is conventionally understood to point in the direction of the electric field.

In mobile communications, in general, multiple-input multiple-output (MIMO) antennas are designed as dual-polarized antennas to reduce a fading effect caused by multiple paths and perform polarization diversity functions. However, in a Massive MIMO system using multiple beams, a correlation coefficient of a wireless channel increases due to interference between adjacent beams, making it difficult to use spatial resources efficiently.

DETAILED DESCRIPTION OF INVENTION

Technical Problems

In order to increase a gain of an antenna, the present disclosure presents an antenna array suitable for separating space (or sectors) through beams having different polarizations, a configuration of an antenna panel in which antenna arrays are arranged, and spatial multiplexing of beams using the same.

Technical Solution

According to one embodiment of the present disclosure, an antenna system includes an antenna array including a first column of dual-polarized antenna units and a second column of dual-polarized antenna units. Each of the dual-polarized antenna units includes a first antenna element and a second antenna element perpendicularly crossing each other. In each column, the first antenna elements are conductively connected to form a first subarray and the second antenna elements are conductively connected to form a second subarray. The antenna system further includes an RF matrix that selectively adjusts phases of RF input signals to generate RF output signals provided to the subarrays. When the RF output signals are radiated by the dual-polarized antenna units, a first beam with +/−45° polarizations and a second beam with 0°/90° polarizations are formed, and the first beam and the second beam are formed toward spatially different directions from each other.

The RF matrix may be implemented with quadrature hybrid couplers (QHC) formed on a PCB. The RF matrix may be configured to selectively adjust phases of the plurality of branch signals based on a phase difference for forming the first beam and the second beam and a phase difference for determining the polarization of the first beam and the second beam.

A phase adjusted by the RF matrix circuit for a pair of RF input signals propagated by the first beam among the RF input signals, is defined to achieve a desired spatial direction in which the first beam is formed. A phase adjusted by the RF matrix circuit for a pair of RF input signals propagated by the second beam among the RF input signals, is defined for a desired spatial direction in which the second beam is formed and polarization synthesis.

The dual-polarized antenna units have +/−45° polarization characteristics, and 0°/90° polarizations of the second beam is obtained by polarization synthesis.

Figure 3:
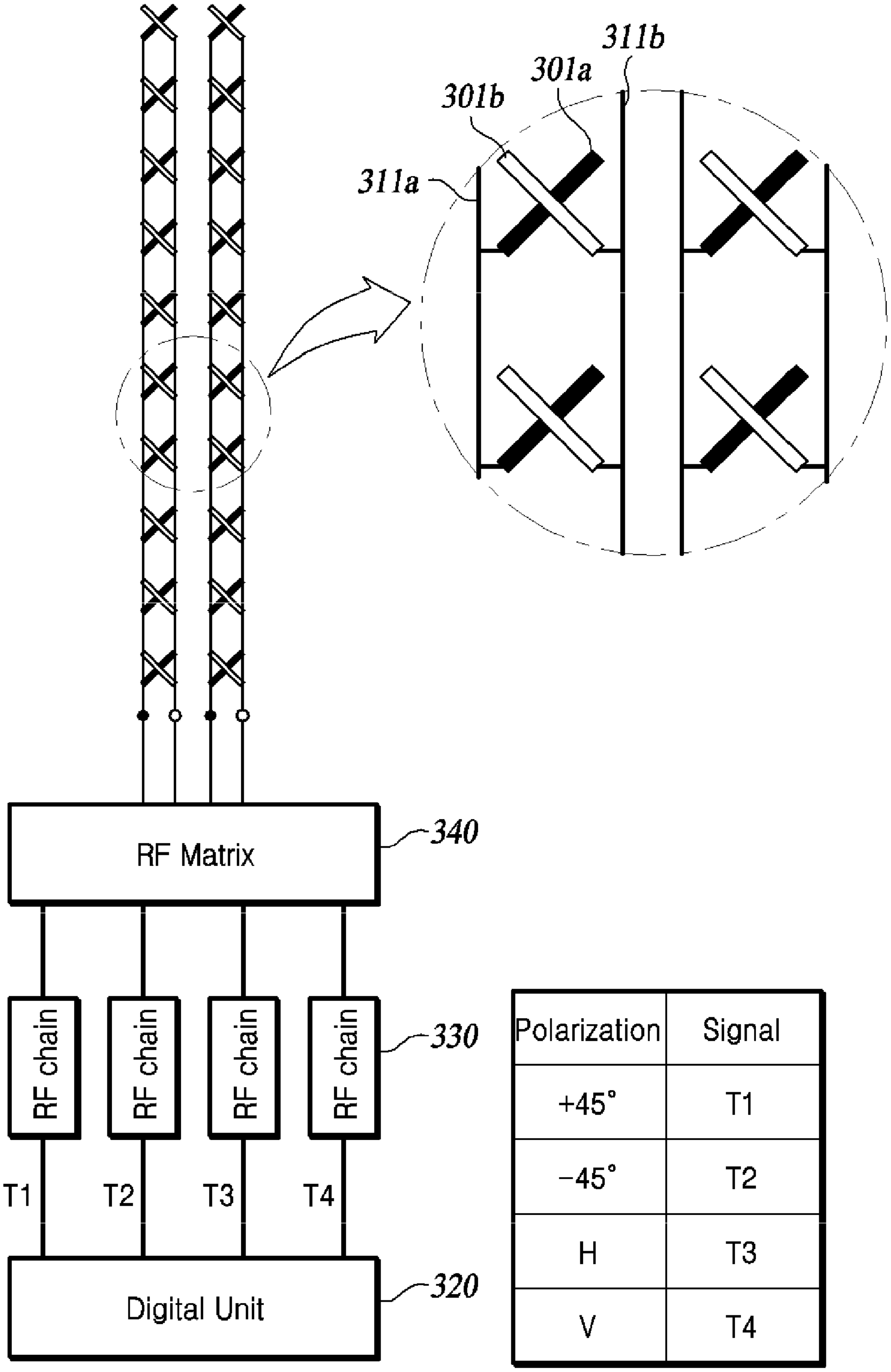
FIG. 3 illustrates a 4T4R polarization diversity antenna system according to one embodiment of the present disclosure, using a +/−45° dual-polarization antenna array.

FIG. **4*a* is a conceptual diagram briefly expressing an RF domain of the antenna system of FIG. 3** for convenience of explanation.

FIG. **4*b* illustrates a pair of beams that the antenna system of FIG. 3** can form and input signals involved in forming these beams.

Figure 4A:
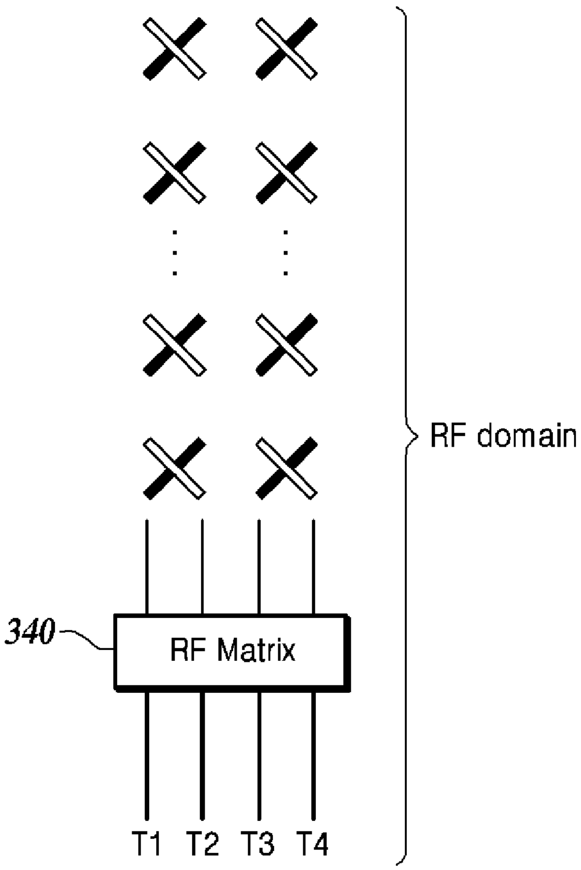
Figure 4B:
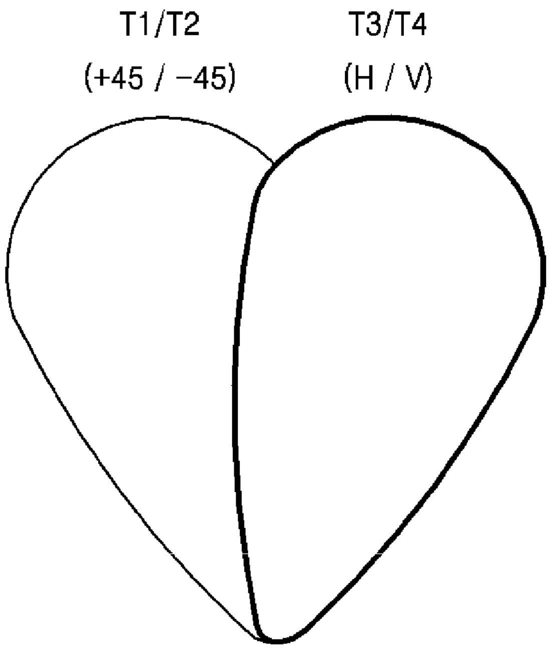

FIG. **4*c* is a table illustrating a phase shift experienced while input signals T1, T2, T3, and T4 reach sub-arrays of an antenna array through an RF matrix to form the pair of beams illustrated in FIG. 4*b***.

FIG. **5*a*** is an example of an RF matrix implemented using a quadrature hybrid coupler (QHC) according to an aspect of the present disclosure.

Figure 5A:
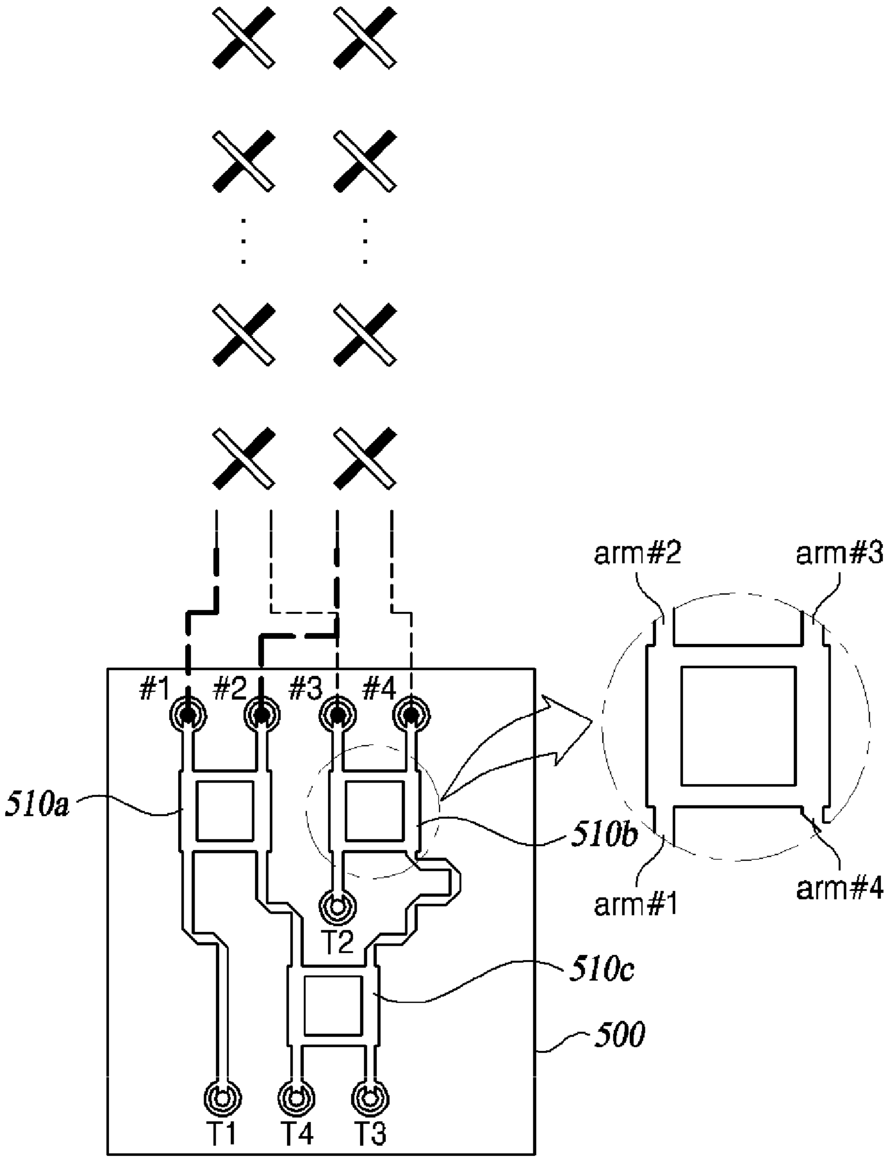

FIG. **5*b* illustrates the pattern of beams that can be formed using an RF matrix 500 illustrated in FIG. 5*a*** and dual polarization characteristics of the beams.

FIG. **6*a*** illustrates a 4T4R polarization diversity antenna system according to another embodiment of the present disclosure, using an antenna array including heterogeneous dual-polarized antenna units.

Figure 6A:
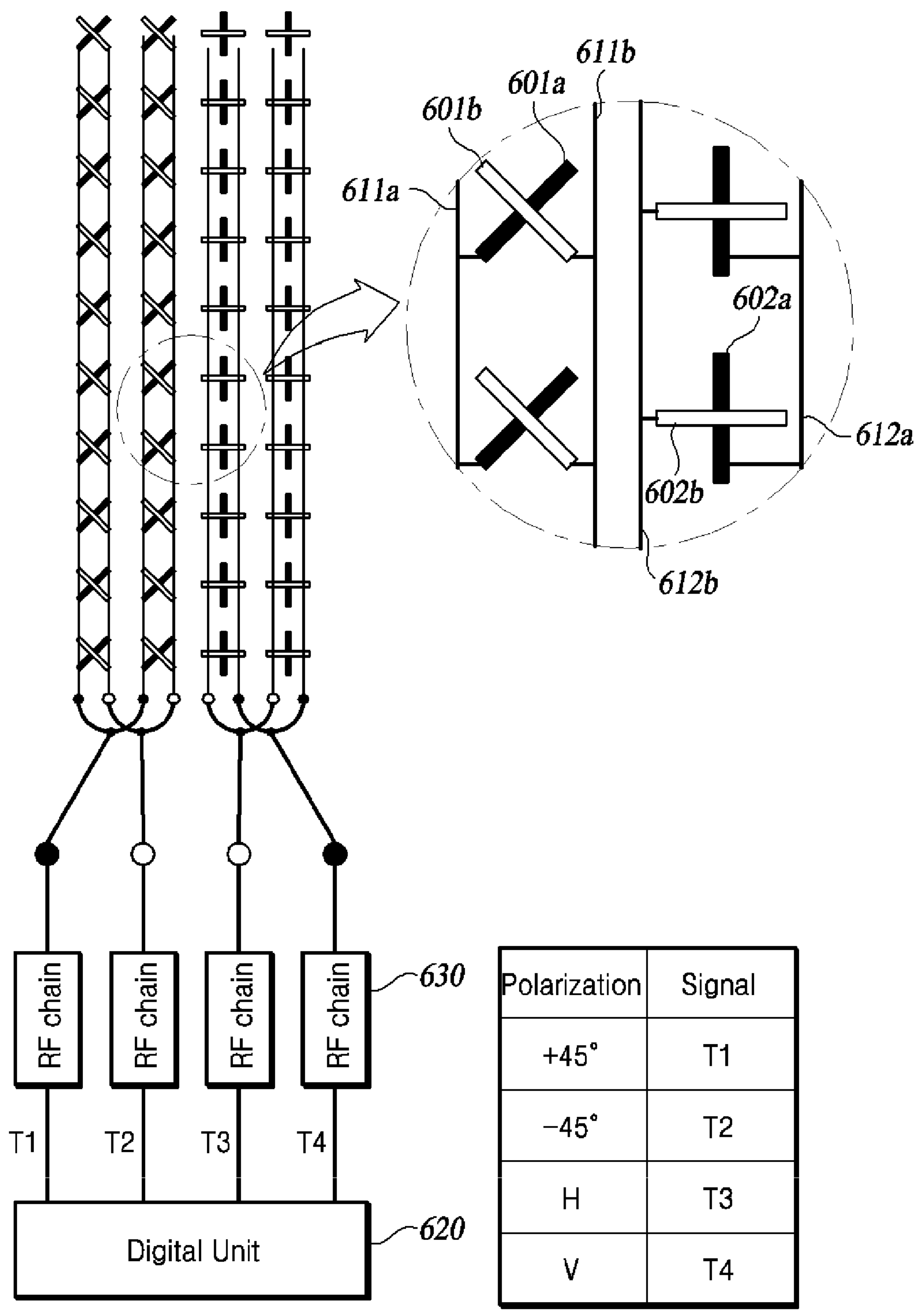

FIG. **6*b* is a top view of an example antenna panel that may be employed in the antenna system of FIG. 6*a***.

Figure 6B:
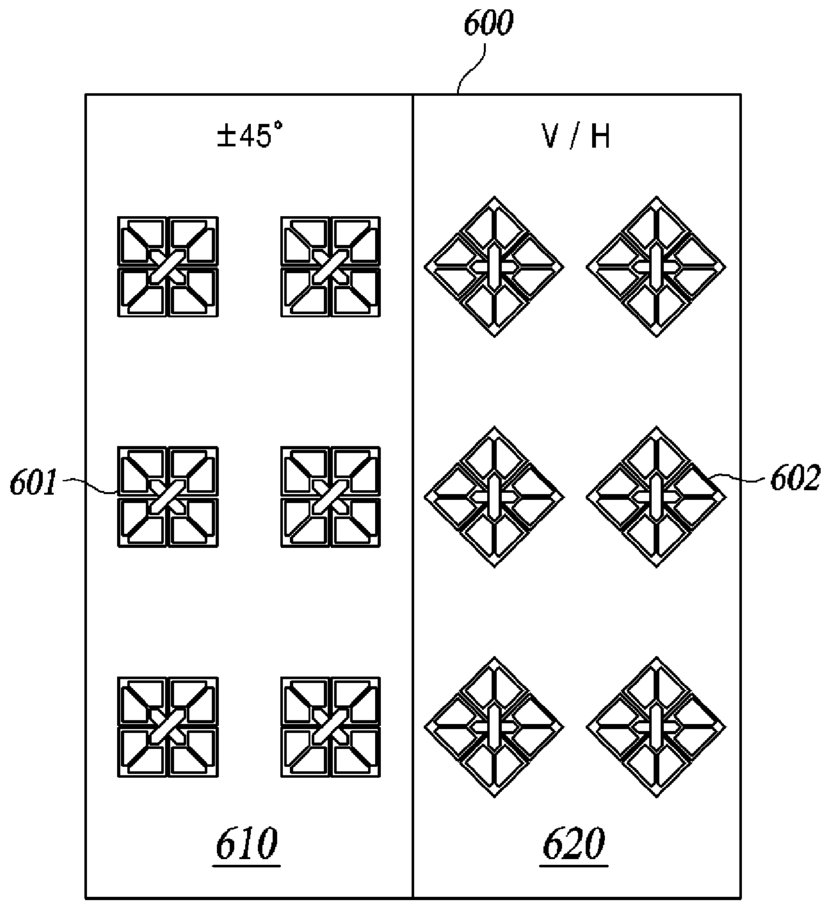

FIGS. **6*c* and 6*d* are front views illustrating a structure of the antenna panel of FIG. 6*b***.

FIG. **6*e*** illustrates a configuration in which subarrays of the same polarization located in different columns are connected to an RF chain through RF paths of different lengths.

FIG. **7*a*** illustrates an antenna panel in which heterogeneous dual-polarized antenna units are arranged according to another embodiment of the present disclosure.

Figure 7A:
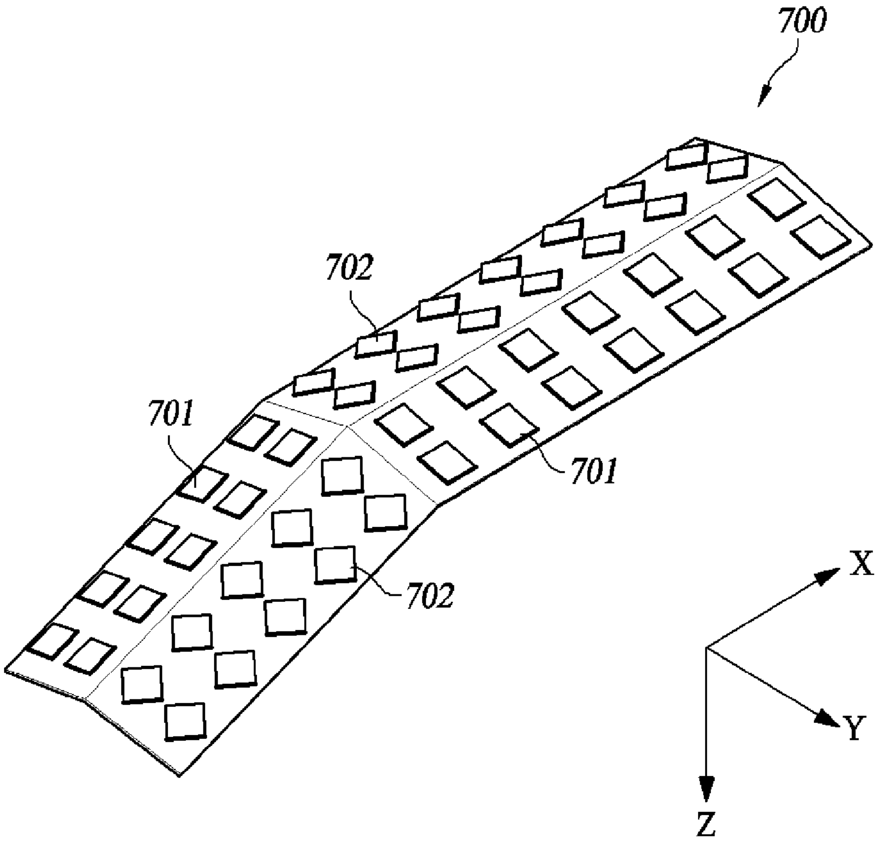

FIG. **7*b* illustrates a main coverage and a sub-coverage that can be covered using the antenna panel illustrated in FIG. 7*a***.

DETAILED DESCRIPTION

Hereinafter, exemplary embodiments of the present disclosure will be described in detail with reference to the accompanying drawings. It is to be noted that in giving reference numerals to components of the accompanying drawings, the same components will be denoted by the same reference numerals even though they are illustrated in different drawings. Further, in describing exemplary embodiments of the present disclosure, well-known functions or configurations will not be described in detail since they may unnecessarily obscure the understanding of the present disclosure.

The present disclosure relates to a polarization diversity antenna system suitable for separating space (sectors) through beams with different polarizations, in order to increase the gain of the antenna.

To better understand the technical utility of the proposed techniques, it may be useful to start with a description of the solutions that can be considered for forming beams having different polarization characteristics in an antenna system using a dual-polarization antenna array.

Figure 1:
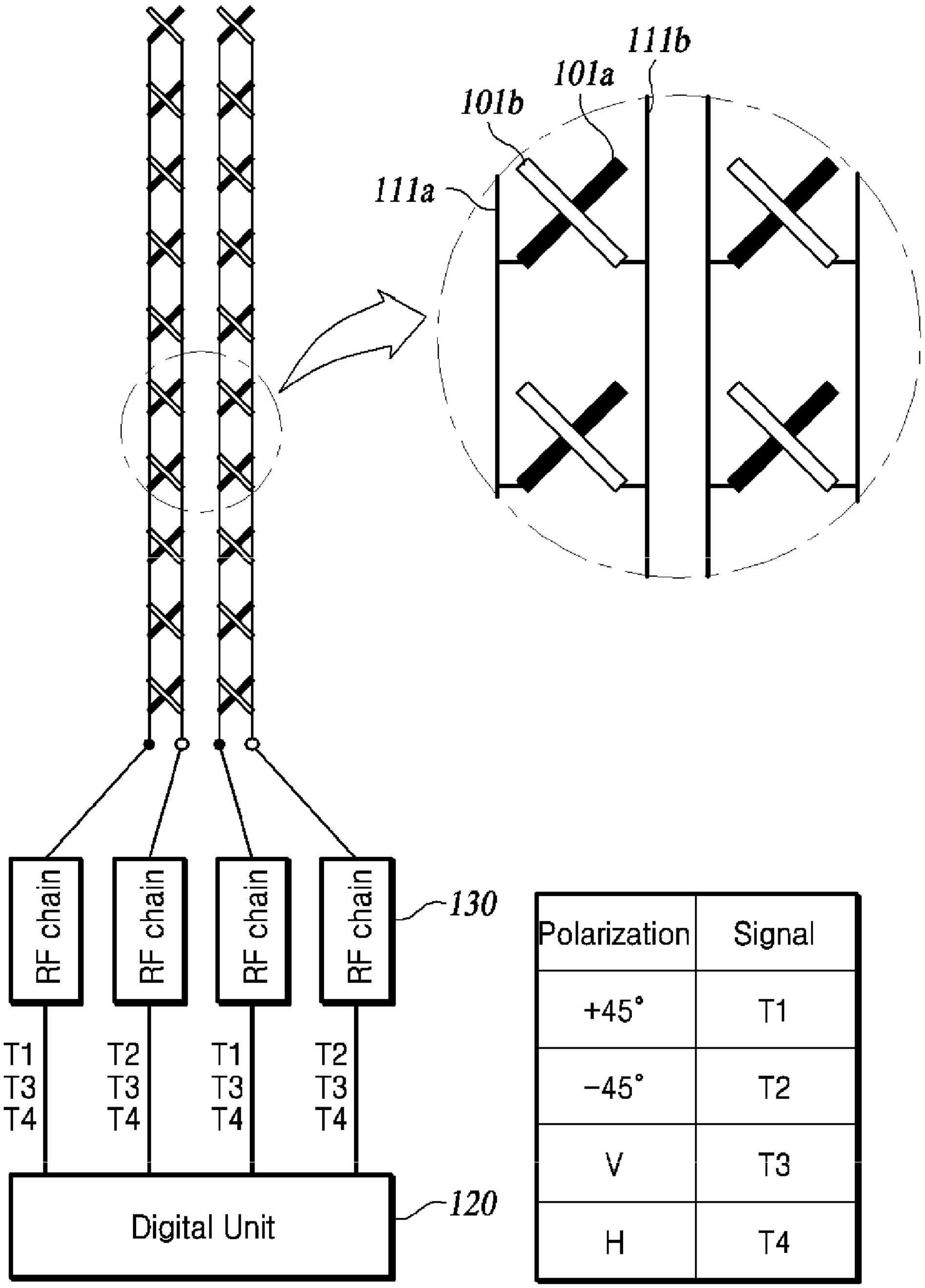
FIG. 1 illustrates a conventional 4T4R polarization diversity antenna system using a +45°/−45° dual-polarization antenna array.
Figure 2:
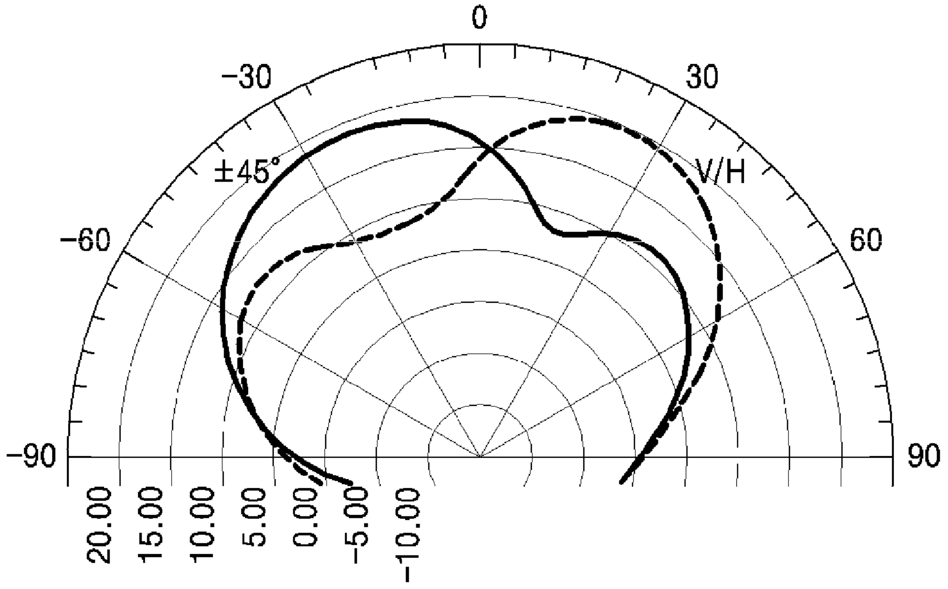
FIG. 2 illustrates a spatially multiplexed beam pattern that can be formed by the antenna system of FIG. 1.

FIG. 1 illustrates a conventional 4T4R polarization diversity antenna system using a +45°/−45° dual-polarization antenna array. The antenna system of FIG. 1 may achieve quadruple polarization diversity through polarization synthesis in a digital domain. FIG. 2 illustrates a spatially multiplexed beam pattern that can be formed by the antenna system of FIG. 1.

Referring to FIG. 1, the antenna array employed in the antenna system consists of two columns of dual-polarized antenna units. Each dual-polarized antenna unit includes a first antenna element 101*a* of +45° polarization and a second antenna element 101*b* of −45° polarization. That is, two columns of dual-polarized antenna units including a +45° linear radiating element and a −45° linear radiating element form the antenna array. In each column, the antenna elements 101*a* and 101*b* are connected to feeder lines 111*a* and 111*b* for each polarization. That is, in each column, the first antenna elements 101*a* of +45° polarization are conductively connected to the first feeder line 111*a* to form a first subarray, and the second antenna elements 101*b* of −45° polarization are conductively connected to the second feeder line 111*b* to form a second subarray. Accordingly, in the dual-polarized antenna array illustrated in FIG. 1, the antenna elements 101*a* and 101*b* are divided into four subarrays.

The four sub-arrays are each connected to four antenna ports through feeder lines 111*a* and 111*b*. Each RF chain 130 is connected to each antenna port. Each RF chain 130 includes RF elements such as a low noise amplifier (LNA), a power amplifier (PA), and a filter, and provides an RF transmission path and an RF reception path. Therefore, the antenna system in FIG. 1 is 4T4R.

The spacing distance between antenna elements having the same polarization characteristics is generally 0.5Δ, where Δ is a wavelength of a center frequency point of a frequency band of the antenna array. To ensure a weak correlation, the larger the spacing distance, the better. That is, in the drawing, the spacing distance between adjacent columns may be 0.5λ, to 1λ.

The antenna system of FIG. 1 may form two beams (that is, a first beam having +/−45° orthogonal polarizations and a second beam having V/H orthogonal polarization) having different dual-polarization characteristics in different spatial directions, from the dual-polarized antenna array, through polarization synthesis for signals T1 to T4 and phase adjustment in a digital domain (for example, digital unit 120) for the desired beam direction.

As illustrated in FIG. 2, beams having a beam width of about 40° based on a horizontal plane may be formed toward different spatial directions (10 o'clock direction and 2 o'clock direction in FIG. 2). The dual-polarization characteristics of the beam in the 10 o'clock direction and the beam in the 2 o'clock direction are different from each other. In particular, these beams may have significant sidelobes.

In FIG. 2, ±45° denoted to indicate the dual-polarization characteristics of each beam indicates that the beam has two orthogonal polarizations consisting of a +45° linear polarization and a −45° linear polarization, and V/H indicates that the beam has two orthogonal polarizations consisting of a 900 (V) linear polarization and a 0° (H) linear polarization. For example, the beam formed toward the 10 o'clock direction has a +45° polarization radio wave and a −45° polarization radio wave, and a beam formed toward the 2 o'clock direction has a 90° polarization radio wave and a 0° polarization radio wave. This is the same in other drawings. However, strictly speaking, the "+/−45° orthogonal polarization beam is formed in the 10 o'clock direction" means that the +45° linear polarization beam and the −45° linear polarization beam are formed toward the 10 o'clock direction. In addition, the "beam of V/H orthogonal polarization is formed in the 2 o'clock direction" means that a beam of 90° (V) linear polarization and a beam of 0° (H) linear polarization are formed toward the 2 o'clock direction.

In FIG. 2, the beam in the 10 o'clock direction of +/−45° orthogonal polarization is formed by providing T1 signals with different phases to the first antenna port and the third antenna port and T2 signals with different phases to the second antenna port and the fourth antenna port.

In FIG. 2, the beam in the 2 o'clock direction of V/H orthogonal polarization is formed by providing T3 signals with different phases and T4 signals with different phases to the first to fourth antenna ports. When the T3 signals with different phases are radiated from the four subarrays of the antenna array, 90° (V) polarization is formed as a result of polarization synthesis. Similarly, when the T4 signals with different phases are radiated from the four subarrays of the antenna array, 0° (H) polarization is formed as a result of polarization synthesis.

Contrary to what is illustrated in FIG. 2, the phase adjustment in the digital unit may be made so that the beam in the 10 o'clock direction has V/H orthogonal polarization and the beam in the 2 o'clock direction has +/−45° orthogonal polarization.

The antenna system illustrated in FIG. 1 may be implemented by adding a digital processing function to perform polarization separation/synthesis and beamforming in the digital domain in an active antenna system (AAS) or a remote radio antenna (RRA) system, which is an antenna system in which a remote radio head (RRH) is integrated. The antenna system illustrated in FIG. 1 requires hardware to implement the beamforming and the polarization synthesis/separation performed in the digital domain, and heat generation may increase accordingly. A specific method of forming beams with +/−45° orthogonal polarization and V/H orthogonal polarization from a dual-polarized antenna array through phase adjustment in the digital domain (that is, digital unit) is, for example, disclosed in Korean Patent Application No. 10-2020-0046256 filed on Apr. 16, 2020 by the applicant of the present application.

FIG. 3 illustrates a 4T4R polarization diversity antenna system according to one embodiment of the present disclosure, using a +/−45° dual-polarization antenna array. The antenna system illustrated in FIG. 3 produces two independent beams (that is, a beam with +/−45° orthogonal polarization and a beam with V/H orthogonal polarization) in different spatial directions through RF signal processing including phase adjustment for signals in the RF domain.

The antenna array employed in the antenna system of FIG. 3 is substantially the same as the antenna array employed in the antenna system of FIG. 1. That is, in FIG. 3, the antenna array consists of two columns of the dual-polarized antenna units. Each dual-polarized antenna unit includes a first antenna element 301*a* of +45° polarization and a second antenna element 301*b* of −45° polarization. In each column, the antenna elements 301*a* and 301*b* are connected to feeder lines 311*a* and 311*b* for each polarization. Accordingly, in the dual-polarized antenna array illustrated in FIG. 3, the antenna elements 301*a* and 301*b* are divided into four subarrays.

Transmission signals T1, T2, T3, and T3 from the digital unit 320 are supplied to the four RF chains 330, and the RF signals output from the RF chains 330 are signal-processed by an RF matrix 340 and then supplied to the four sub-arrays of the antenna array. Therefore, the antenna system in FIG. 3 is 4T4R.

The RF matrix 340 is configured to perform signal processing including signal branching and phase adjustment on RF signals input from the RF chains 330. The RF matrix 340 may be implemented by passive elements such as a hybrid coupler, directional coupler, and phase shifter. The signal-processed RF signals output from the RF matrix 340 are radiated in space through four sub-arrays of the antenna array, and as a result, two independent beams (i.e., a beam with +/−45° orthogonal polarization and a beam with V/H orthogonal polarization) can be generated in different spatial directions, as illustrated in FIG. 2. Contrary to what is illustrated in FIG. 2, phase adjustment in the RF matrix 340 may be made so that the beam in the 10 o'clock direction has V/H orthogonal polarization and the beam in the 2 o'clock direction has +/−45° orthogonal polarization.

The antenna system of FIG. 3 may not only be implemented as an AAS/RRA system with an RF circuit on which the RF matrix 340 is formed, but also may be implemented by placing the RF circuit board on which the RF matrix 340 is formed between a legacy antenna system and the RRH. Therefore, even existing legacy antenna systems may be easily modified to support quadruple polarization diversity. However, an RF loss occurs due to the RF matrix 340, and it may be difficult to maintain an accurate spacing between beams.

Meanwhile, the antenna array illustrated in FIG. 3 has two columns of dual-polarized antenna units, but in other implementations, the antenna array may have more columns to form more beams or to form a narrower beamwidth.

Now, with reference to FIGS. 4*a*, 4*b*, and 4*c*, in the 4T4R polarization diversity antenna system of FIG. 3, signal processing including a phase shift that the RF matrix 340 must provide to RF signals for the polarization synthesis and desired beam direction will be described.

FIG. 4*a* is a conceptual diagram briefly expressing the RF domain of the antenna system of FIG. 3 for convenience of explanation. FIG. 4*b* illustrates a pair of beams that the antenna system of FIG. 3 can form and the input signals involved in forming these beams. A table in FIG. 4*c* illustrates a phase shift that the input signals T1, T2, T3, and T4 experience while reaching the subarrays of the antenna array through the RF matrix 340 to form the pair of beams illustrated in FIG. 4*b*.

Referring to FIGS. 4*a* and 4*b*, the input signals T1 and T2 form the first beam with +/−45° orthogonal polarization through the RF matrix 340, and the input signals T3 and T4 form the second beam with V/H polarization through the RF matrix 340. The above two beams have different spatial directions. In FIG. 4*b*, the first beam with +/−45° orthogonal polarization is formed toward the 10 o'clock direction, and the second beam with V/H orthogonal polarization is formed toward the 2 o'clock direction.

In order to form the beam pattern illustrated in FIG. 4*b*, signal processing performed by the RF matrix 340 on the input signals T1, T2, T3, and T4, that is, the phase shift that the input signals T1, T2, T3, and T4 experience while reaching the subarrays of the antenna array through the RF matrix 340, is as follows.

The target polarization of the input signal T1 is +45° polarization, and is provided in a subarray (this is denoted as "C1+45" in the table of FIG. 4*b*) of +45° polarization antenna elements in the first column (C1; left column) through the RF matrix 340 and a subarray (this is denoted as "C2+45" in the table of FIG. 4*b*) of +45° polarization antenna elements of the second column (C2; right column).

The target polarization of the input signal T2 is −45° polarization, and is provided in a subarray (this is denoted as "C1−45" in the table of FIG. 4*b*) of −45° polarization antenna elements in the first column C1 through the RF matrix 340 and a subarray C2−45 of −45° polarization antenna elements of the second column C2.

The target polarization of the input signal T3 is H polarization, and the target polarization of the input signal T4 is V polarization. The input signal T3 and input signal T4 are provided to four subarrays (C1+45; C1−45; C2+45; C2−45) of the dual-polarization array through the RF matrix 340, respectively.

The input signal T1 is branched by the RF matrix 340 into two branch signals, so that one branch signal reaches the subarray C1+45 with +45° polarization of the first column without phase shift and the other branch signal reaches the subarray C2+45 with +45° polarization of the second column after undergoing the phase shift of −90°. Since the target polarization of the input signal T1 is +45° polarization, the phase shift of −90° is only for beamforming. The two branch signals corresponding to the input signal T1 are radiated by the subarrays C1+45 and C2+45 with a phase difference of −90°, and thus, the beam with the +45° polarization is formed in the spatial direction tilted approximately 30° to the left based on the normal line of the antenna array.

The input signal T2 is branched by the RF matrix 340 into two branch signals, so that one branch signal reaches the subarray C1−45 with the −45° polarization of the first column without phase shift and the other branch signal reaches the subarray C2−45 with the −45° polarization of the second column after undergoing a phase shift of −90°. Since the target polarization of the input signal T2 is −45° polarization, the phase shift of −90° is only for beamforming.

The two branch signals corresponding to the input signal T2 are radiated by the subarrays C1−45 and C2−45 with a phase difference of −90°, and thus, the beam with the −45° polarization is formed in the spatial direction tilted approximately 300 to the left based on the normal line of the antenna array.

The input signal T3 is branched into four branch signals by the RF matrix 340. A first branch signal reaches the subarray C1+45 of the first column without phase shift, and the second branch signal, the third branch signal, and the fourth branch signal reach the subarray C1−45 of the first column, the subarray C2+45 of the second column, and the subarray C2−45 of the second column after undergoing phase shifts of 180°, 90°, and 270°, respectively. The phase shift (180°) of the second branch signal is only for polarization synthesis, the phase shift (90°) of the third branch signal is only for beamforming, and the phase shift (270°) of the fourth branch signal is the sum of the phase shift (90°) for beamforming and the phase shift (180°) for polarization synthesis.

The first branch signal and the second branch signal corresponding to the input signal T3 are radiated by the subarrays C1+45 and C1−45 of the first column C1 with a phase difference of 180°, and thus, a beam with 0° (H) polarization is formed (that is, polarization synthesis occurs). The third branch signal and the fourth branch signal are radiated by the subarrays C1+45 and C1−45 of the first column C1 with the phase difference of 180°, and thus, the beam with 0° (H) polarization is formed (that is, polarization synthesis occurs). In addition, the first branch signal radiated by the subarray C1+45 of the first column and the third branch signal radiated by the subarray C2+45 of the second column have a phase difference of +90° and the second branch signal radiated by the subarray C1−45 of the first column and the fourth branch signal radiated by the subarray C2−45 of the second column have a phase difference of +90°. Therefore, a beam with 0° (H) polarization is formed in a spatial direction tilted approximately 300 to the right based on the normal line of the antenna array.

The input signal T4 is branched into four branch signals by the RF matrix 340, and thus, the first branch signal reaches the subarray C1+45 of the first column without phase shift, and the second branch signal, the third branch signal, and the fourth branch signal reach the subarray C1−45 of the first column, the subarray C2+45 of the second column, and the subarray C2−45 of the second column after undergoing the phase shifts of 180°, 90°, and 270°, respectively.

Since the first branch signal and the second branch signal corresponding to the input signal T4 are radiated by the subarrays C1+45 and C1−45 of the first column C1 with the phase difference of 0°, the beam with 90° (V) polarization is formed (that is, polarization synthesis occurs). Since the third branch signal and the fourth branch signal are radiated by the subarrays C1+45 and C1−45 of the first column C1 with the phase difference of 0°, the beam with 90° (V) polarization is formed (that is, polarization synthesis occurs). In addition, the first branch signal radiated by the subarray C1+45 of the first column and the third branch signal radiated by the subarray C2+45 of the second column have a phase difference of +90°, and the second branch signal radiated by the subarray C1−45 of the first column and the fourth branch signal radiated by the subarray C2−45 of the second column have a phase difference of +90°. Therefore, the beam with 90° polarization is formed in the spatial direction tilted approximately 30° to the right based on the normal line of the antenna array.

Figure 5B:
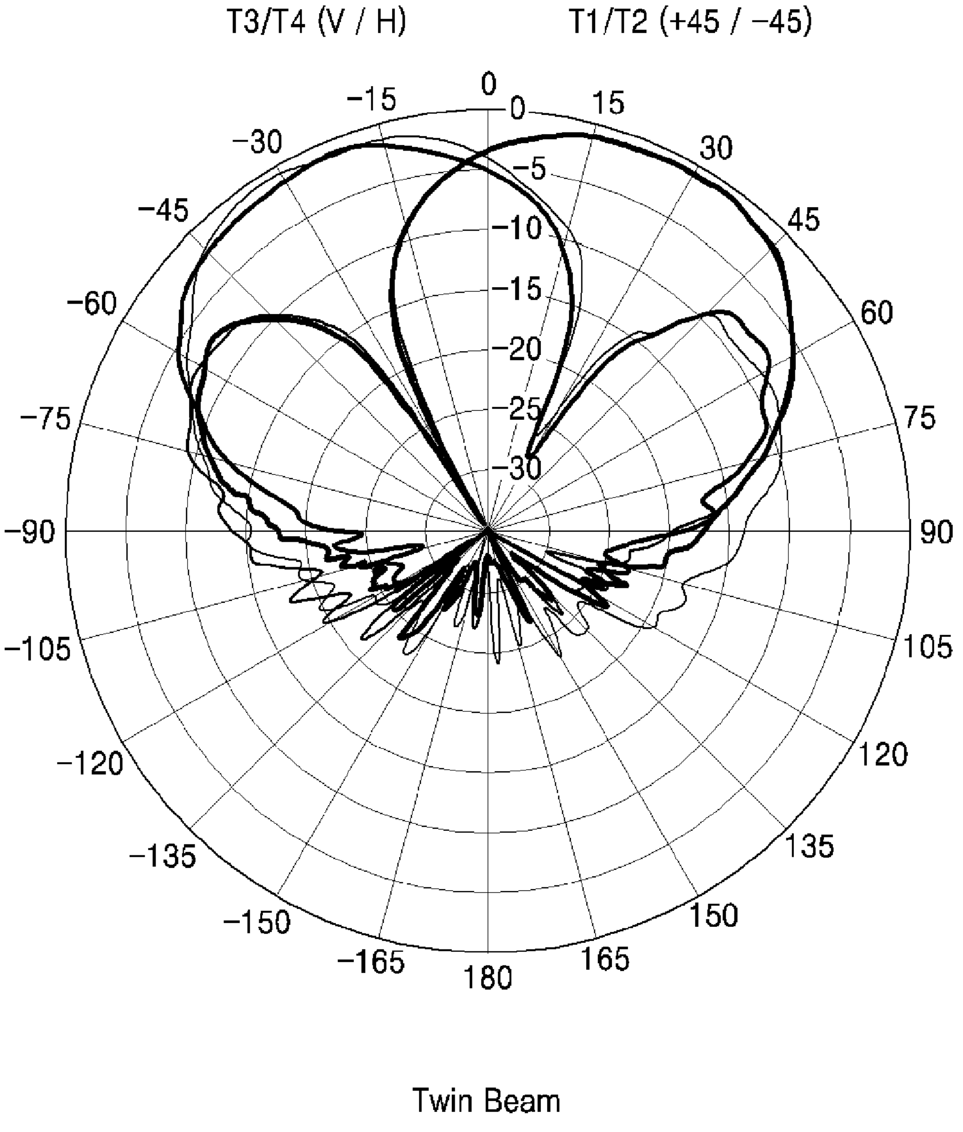

FIG. 5*a* is an example of an RF matrix 500 implemented using a quadrature hybrid coupler (QHC) according to an aspect of the present disclosure. QHC is also referred to as a "branch-line coupler" or a "90° Hybrid coupler". FIG. 5*b* illustrates the pattern of beams that can be formed using the RF matrix 500 illustrated in FIG. 5*a* and the dual polarization characteristics of the beams. The polarization characteristics of the beams illustrated in FIG. 5*b* are opposite to those illustrated in FIG. 4*b*. That is, in FIG. 4*b*, the beam in the 10 o'clock direction has +45°/−45° orthogonal polarization, and in FIG. 5*b*, the beam in the 2 o'clock direction has +45°/−45° orthogonal polarization. As described with reference to FIG. 2, strictly speaking, the "beam of +/−45° orthogonal polarization is formed in the 2 o'clock direction" means that the beam of +45° linear polarization and the beam of −45° linear polarization are formed in the 2 o'clock direction, and the "beam of V/H orthogonal polarization is formed in the 10 o'clock direction means that the beam of 90° (V) linear polarization and the beam of 0° (H) linear polarization are formed in the 10 o'clock direction.

The RF matrix 500 illustrated in FIG. 5*a* has four input ports (indicated by white circles), three QHCs 510*a*, 510*b*, and 510*c* formed by conductive strips, and four output ports (indicated by black circles) on a PCB.

As illustrated in the enlarged view of FIG. 5*a*, QHCs 510*a*, 510*b*, and 510*c* each have four arms (that is, first to fourth arms), and when a signal is input to the first arm, the output appears in the second arm and the third arm and the output does not appear in the fourth arm. Additionally, there is a phase difference of 90° (that is, Δ/4) between the output signals of the second arm and the third arm. The QHCs 510*a*, 510*b*, and 510*c* have a top-bottom/left-right symmetrical shape, and when a signal is input to the second arm, the output appears in the first and fourth arms, but the output does not appear in the third arm. In other words, it operates in a completely symmetrical structure.

The input signal T1 reaches the subarray C1+45 of the first column through "the first input port—the first arm of the first QHC 510*a*—the second arm of the first QHC 510*a*—the first output port". In addition, the input signal T1 reaches the subarray C2+45 of the second column through "the first input port—the first arm of the first QHC 510*a*—(phase delay of 90°)—the third arm of the first QHC 510*a*—the third output port". Therefore, from the perspective of the input signal T1, the wireless signal radiated from the subarray C2+45 of the second column has the phase delay of 90° compared to the wireless signal radiated from the subarray C1+45 of the first column, and as illustrated in FIG. 5*b*, the beam with +45° polarization is formed in the spatial direction tilted approximately 30° to the right based on the normal line of the antenna array.

The input signal T2 reaches the subarray C1−45 of the first column through "the second input port—the first arm of the second QHC 510*b*—the second arm of the second QHC 510*b*—the second output port". In addition, the input signal T2 reaches the subarray (C1−45) of the second column through "the second input port—the first arm of the second QHC 510*b*—(phase delay of 90°)—the third arm of the second QHC 510*b*—the fourth output port". Therefore, from the perspective of the input signal T2, the wireless signal radiated from the subarray C2−45 of the second column has a phase delay of 90° compared to the wireless signal radiated from the subarray C1−45 of the first column, and as illustrated in FIG. 5*b*, the beam with −45° polarization is formed in the spatial direction tilted approximately 30° to the right based on the normal line of the antenna array.

The input signal T3 reaches the subarray C1+45 of the first column through "the third input port—the fourth arm of the third QHC 510*c*—(the phase delay of 90°)—the second arm of the third QHC 510*c*—the fourth arm of the first QHC 510*a*—(the phase delay of 90°)—the second arm of first QHC 510*a*—the first output port". In addition, the input signal T3 reaches the subarray C2+45 through "the third input port—the fourth arm of the third QHC 510*c*—(the phase delay of 90°)—the second arm of the third QHC 510*c*—the fourth arm of the first QHC 510*a*—the third arm of the first QHC 510*a*—the third output port". In addition, the input signal T3 reaches the subarray C−45 of the first column through "the third input port—the fourth arm of the third QHC 510*c*—(the phase delay of 90°)—the third arm of the third QHC 510*c*—the fourth arm of the second QHC 510*b*—(the phase delay of 90°)—the second arm of the second QHC 510*b*—the second output port”. In addition, the input signal T3 reaches the subarray C2−45 of the second column through “the third input port—the fourth arm of the third QHC 510*c*—(the phase delay of 90°)—the third arm of the third QHC 510*c*—the fourth arm of the second QHC 510*b*—the third arm of the second QHC 510*b*—the fourth output port”.

Therefore, from the perspective of the input signal T3, the wireless signal radiated from the subarray C1−45 of the first column has a phase delay of 0° compared to the wireless signal radiated from the subarray C1+45 of the first column, and the wireless signal radiated from the subarray C2−45 of the second column has a phase delay of 0° compared to the wireless signal radiated from the subarray C2+45 of the second column. As a result, the beam with 90° (V) polarization is formed (that is, polarization synthesis occurs). In addition, the wireless signal radiated from the subarray C1+45 of the first column has a phase delay of 90° compared to the wireless signal radiated from the subarray C2+45 of the second column, and the wireless signal radiated from the subarray C1−45 of the first column has a phase delay of 90° compared to the wireless signal radiated from the subarray C2−45 of the second column. Accordingly, as illustrated in FIG. 5*b*, the beam with 90° (V) polarization is formed in the spatial direction tilted approximately 30° to the left based on the normal line of the antenna array.

The input signal T4 reaches the subarray C1+45 of the first column through “the fourth input port—the first arm of the third QHC 510*c*—the second arm of the third QHC 510*c*—the fourth arm of the first QHC 510*a*—(phase delay of 90°)—the second arm of the first QHC 510*a*—the first output port”. In addition, the input signal T4 reaches the subarray (C2+45) in the second column “the fourth input port—the first arm of the third QHC 510*c*—the second arm of the third QHC 510*c*—the fourth arm of the first QHC 510*a*—the third arm of the first QHC 510*a*—the third output port”. In addition, the input signal T4 reaches the subarray C1−45 of the first column through “the fourth input port—the first arm of the third QHC 510*c*—(phase delay of 90°)—the third arm of the third QHC 510*c*—(phase delay of 90°)—the fourth arm of the second QHC 510*b*—(phase delay of 90°)—the second arm of the second QHC 510*b*—the second output port”. In addition, the input signal T4 is supplied to the subarray C2−45 of the second column through “the fourth input port—the first arm of the third QHC 510*c*—(phase delay of 90°)—the third arm of the third QHC 510*c*—(phase delay of 90°)—the fourth arm of the second QHC 510*b*—the third arm of the second QHC 510*b*—the fourth output port”.

Therefore, from the perspective of the input signal T4, the wireless signal radiated from the subarray C1−45 of the first column has a phase delay of 180° compared to the wireless signal radiated from the subarray C1+45 of the first column, and the wireless signal radiated from the subarray C2−45 of the second column has a phase delay of 180° compared to the wireless signal radiated from the subarray C2+45 of the second column. As a result, the beam with 0° (H) polarization is formed (that is, polarization synthesis occurs). In addition, the wireless signal radiated from the subarray C1+45 of the first column has a phase delay of 90° compared to the wireless signal radiated from the subarray C2+45 of the second column, and the wireless signal radiated from the subarray C1−45 of the first column has a phase delay of 90° compared to the wireless signal radiated from the subarray C2−45 of the second column. Therefore, as illustrated in FIG. 5*b*, a beam with 0° (H) polarization is formed in the spatial direction tilted approximately 30° to the left based on the normal line of the antenna array.

FIG. 6*a* illustrates a 4T4R polarization diversity antenna system according to another embodiment of the present disclosure, using an antenna array including heterogeneous dual-polarized antenna units.

The antenna system illustrated in FIG. 6*a* generates spatially multiplexed orthogonally polarized beams similar to FIG. 1 or FIG. 3 using heterogeneous dual-polarized antenna units without requiring signal processing in the digital domain or RF domain. Accordingly, Tx signals T1, T2, T3, and T4 illustrated in FIG. 6*a* are signals to which polarization synthesis in the digital domain has not been applied. Similarly, the polarization synthesis in the digital domain is not applied to Rx signals.

Referring to FIG. 6*a*, an antenna array in which heterogeneous dual-polarized antenna units are arranged in four columns is illustrated. The two columns on the left are composed of dual-polarized antenna units of +45°/−45°, and the two columns on the right are composed of dual-polarized antenna units of V/H.

In each column, the antenna elements 601*a*, 601*b*, 602*a*, and 602*b* are connected to feeder lines 611*a*, 611*b*, 612*a*, and 612*b* for each polarization. For example, in each of the first and second columns, the first antenna elements 601*a* of +45° polarization are connected to the first feeder line 611*a* to form the first subarray, and the second antenna elements 601*b* of −45° polarization are connected to the second feeder line 611*b* to form the second subarray.

In each of the third and fourth columns, the first antenna elements 602*a* of 90° (V) polarization are connected to the first feeder line 612*a* to form the first subarray, and the second antenna elements 602*b* of 0° (H) polarization are connected to the second feeder line 612*b* to form the second subarray. Accordingly, in the dual-polarized antenna array illustrated in FIG. 6*a*, the antenna elements 601*a*, 601*b*, 602*a*, and 602*b* are divided into eight subarrays.

To form a beam for each polarization using the antenna array illustrated in FIG. 6*a*, subarrays with the same polarization are connected to each other in the RF domain. That is, a pair of subarrays for each polarization are combined to each other at the RF domain to be connected to one RF chain 630. As a result, the antenna system is 4T4R. The combination of the subarrays can be achieved by constructing a simple RF combiner in the RF domain.

As described later, the antenna panel is formed so that a first area (or first surface) of the antenna panel in which antenna units with +45°/−45° polarization are arranged and a second area (or second surface) of the antenna panel in which antenna units with V/H polarization are arranged form a predetermined obtuse angle (90°<θ<180°). The first area and the second area may form an angle of 120°, for example. Therefore, due to the antenna panel being bent in the longitudinal direction, the dual-polarized antenna arrays of +45°/−45° and the dual-polarized antenna arrays of V/H are arranged to be spatially oriented in different directions.

In this structure, the beam with +45°/−45° polarization and the beam with V/H polarization are mechanically steered in the spatial direction in which the two regions of the antenna panel look, and thus, by appropriately adjusting the angle θ formed by the two areas of the antenna panel, the antenna system of FIG. 6*a* can generate spatially multiplexed orthogonally polarized beams similar to FIG. 1 or FIG. 3.

The antenna system of FIG. 6*a* only requires simple RF components such as an RF combiner to form a spatially multiplexed beam pattern, hardware for signal processing in the digital domain (required in the antenna system of FIG. 1) is not required, and thus, heat problem can be improved. In addition, the antenna system of FIG. 6*a* is capable of maintaining accurate inter-beam spacing compared to the antenna system illustrated in FIG. 3, and in particular, the antenna system can minimize the area where beams with different dual-polarizations overlap each other, which affects SINR performance.

Figure 6C:
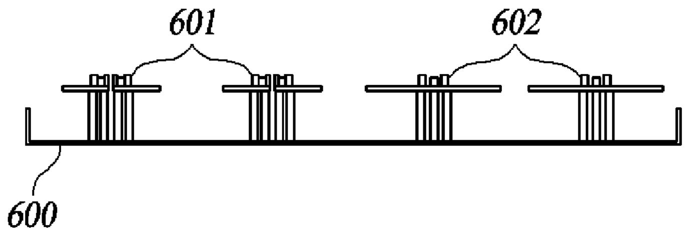
Figure 6C:
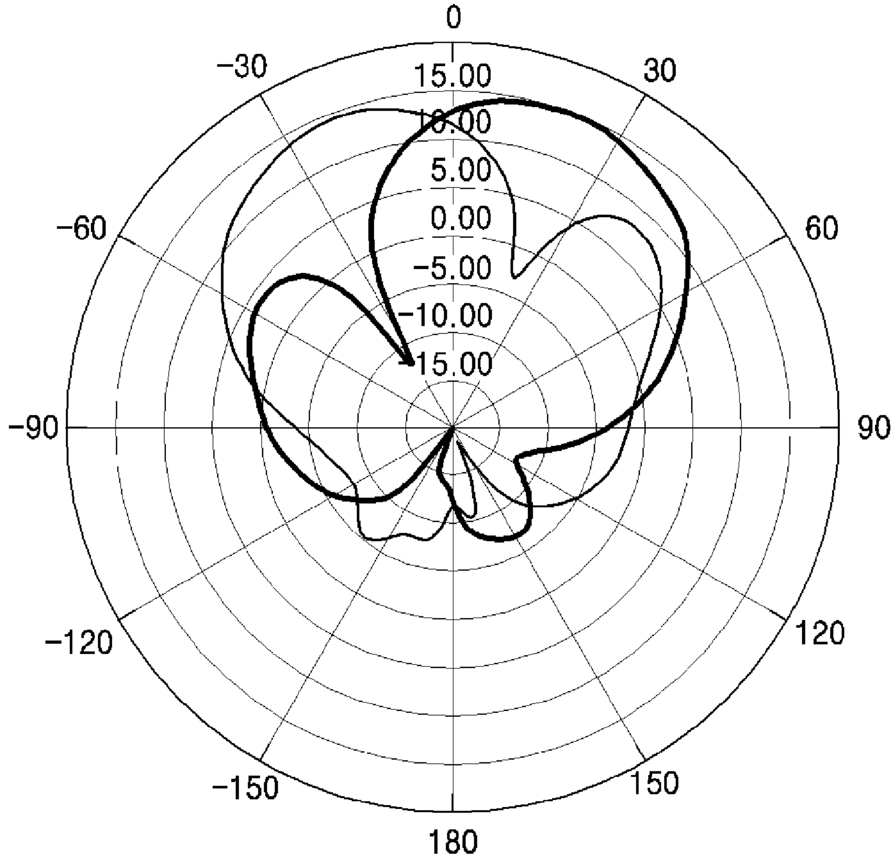
Figure 6D:
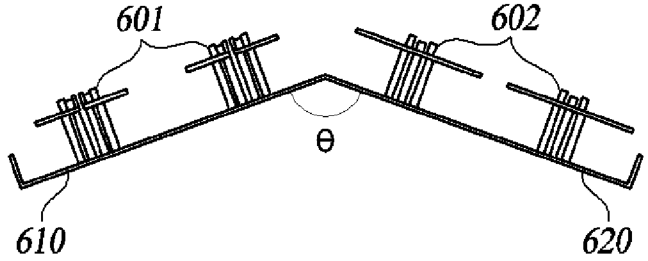
Figure 6D:
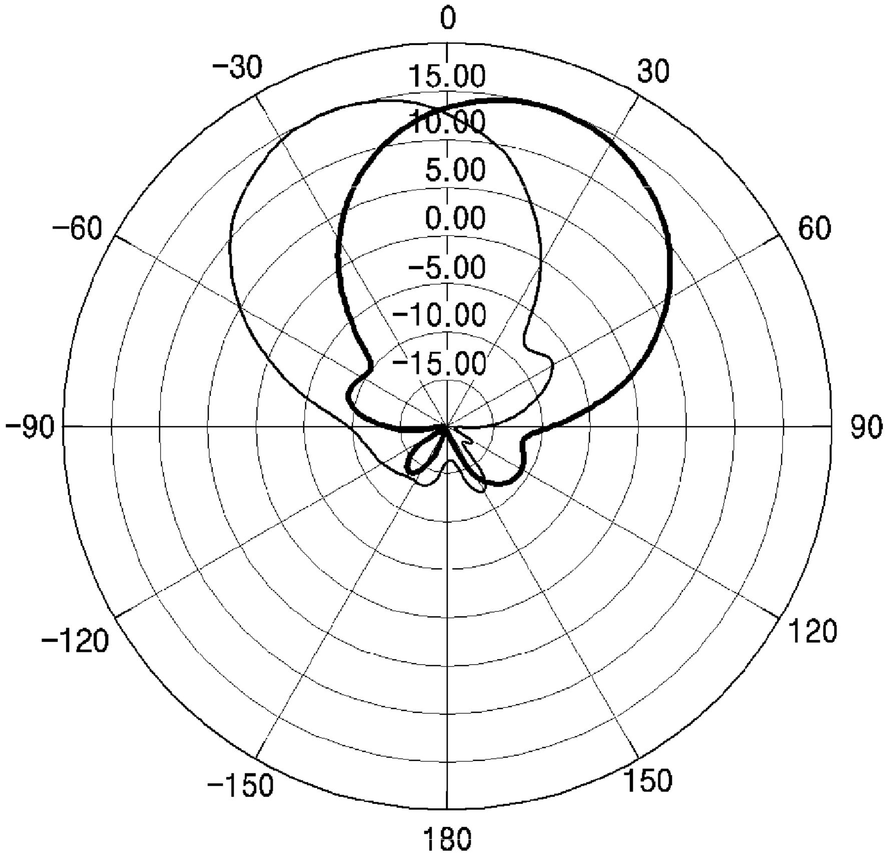

FIGS. 6*b* to 6*d* are diagrams for explaining the structure of the antenna panel in which heterogeneous dual-polarized antenna units are arranged and the usefulness of the structure used in the antenna system of FIG. 6*a*.

FIG. 6*b* is a top view of an example antenna panel 600 that may be employed in the antenna system of FIG. 6*a*. Referring to FIG. 6*b*, the dual-polarized antenna units 601 of +45°/−45° are arranged on a left half 610 of the antenna panel 600, and the dual-polarized antenna units 602 of H/V are arranged on a right half 620 of the antenna panel 600.

When the left half 610 and the right half 620 form one flat surface (refer to the front view of (a) of FIG. 6*c*), by making a phase difference between RF signals applied to the dual-polarized antenna units having the same polarization characteristics, a pair of spatially multiplexed beam patterns as illustrated in (b) of FIG. 6*c* may be obtained. Meanwhile, when the left half 610 of the antenna panel 600 and the right half 620 of the antenna panel form a predetermined obtuse angle (θ) (see the front view of (a) of FIG. 6*d*), even without phase adjustment of RF signals applied to dual-polarized antenna units having the same polarization characteristics, a pair of beam patterns as illustrated in (b) of FIG. 6*d* can be obtained. In the beam pattern of (b) of FIG. 6*c*, there are significant sidelobes around the main lobe, but in the beam pattern of (b) of FIG. 6*d*, there are negligible sidelobes. That is, it can be seen that the structure of the antenna panel and the arrangement of heterogeneous dual-polarized antenna units as illustrated in (a) of FIG. 6*d* are relatively useful for spatial polarization multiplexing.

Figure 6E:
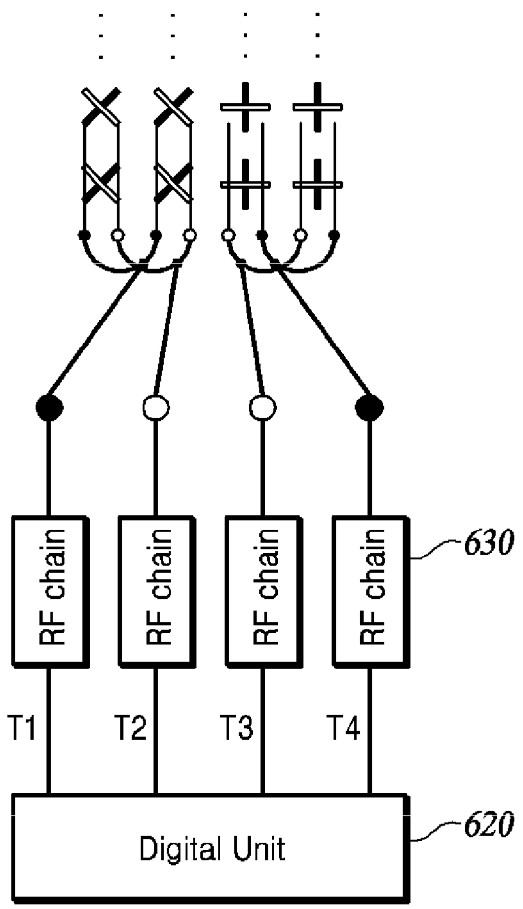

Furthermore, by combining the structure of the antenna panel 600 as illustrated in (a) of FIG. 6*d* and RF beamforming, beams can also be directed in spatial directions that are larger than the spatial direction provided by the angle (θ) formed by the two areas of the antenna panel. For example, in the left half 610 of the antenna panel 600 illustrated in (a) of FIG. 6*d*, the RF paths from the subarray of the first column to the RF chains 630 are formed to be longer than the RF paths from the subarrays of the second column to the RF chains 630, and thus, the beam with +45°/−45° orthogonal polarization may be formed toward the left more than the spatial direction in which the left half of the antenna panel 610 faces. Therefore, by combining the structure of the antenna panel 600 illustrated in (a) of FIG. 6*d* with RF beamforming, the angle θ formed by the left half 610 and the right half 620 of the antenna panel 600 can be further increased (that is, closer to 180°). In this context, FIG. 6*e* illustrates a configuration in which the subarrays of the same polarization located in different columns are connected to the RF chain 630 through the RF paths of different lengths.

FIG. 7*a* illustrates an antenna panel 700 in which heterogeneous dual-polarized antenna units that are bent in the longitudinal direction and bent in the transverse direction are arranged according to another embodiment of the present disclosure.

Referring to FIG. 7*a*, bending in the longitudinal direction (x) divides the antenna panel into left and right areas, and bending in the transverse direction (y) further divides the antenna panel into upper and lower areas. In other words, the antenna panel where the antenna elements are arranged is divided into four areas (planes) facing different directions.

To prevent the antenna elements with the same dual polarization from being placed on two adjacent areas in the horizontal or vertical direction of the antenna panel, +/−45° antenna elements 701 and V/H antenna elements 702 are arranged alternately into four areas (planes).

For example, the dual-polarized antenna units 702 of V/H are arranged on the upper left area of the antenna panel, the dual-polarized antenna units 701 of +/−45° are arranged on the upper right area, the dual-polarized antenna units 701 of +/−45° are arranged on the lower left area, and the dual-polarized antenna units 702 of V/H are arranged on the lower right area.

Similar to the antenna panel 600 illustrated in FIG. 6*a*, in each area (face) of the antenna panel 700 illustrated in FIG. 7*a*, the antenna elements of each column are connected to a feeder line for each polarization to form the subarrays. Additionally, the subarrays located in different columns with the same polarization can be connected to each other in the RF domain. That is, a pair of subarrays located in different columns for each polarization in a given area (face) of the antenna panel 700 can be combined with each other in the RF domain to be connected to one RF chain. As a result, the antenna system using the antenna panel 700 illustrated in FIG. 7*a* may support 8T8R.

Alternatively, +/−45° dual-polarized antenna units 701 arranged on the upper right area and the left lower area of the antenna panel 700 are connected to a pair of RF chains, and the V/H dual-polarized antenna units 702 arranged on the upper left area and the lower right area of the antenna panel 702 may be connected to another pair of RF chains. As a result, the antenna system using the antenna panel 700 illustrated in FIG. 7*a* may support 4T4R.

The +/−45° dual-polarized antenna units 701 arranged on the upper right area form the first beam with +45°/−45° orthogonal polarization, the V/H dual-polarized antenna units 702 arranged on the upper left area form the second beam with V/H orthogonal polarization, the +/−45° dual-polarized antenna units 701 arranged on the lower left area form the third beam with the +45°/−45° orthogonal polarization, and the V/H dual-polarized antenna units arranged on the lower right area form the fourth beam with V/H orthogonal polarization. Each spatial direction toward which the first to fourth beams head coincides with the spatial direction toward which the corresponding areas of the antenna panel face. Accordingly, the first to fourth beams are formed in different spatial directions.

Figure 7B:
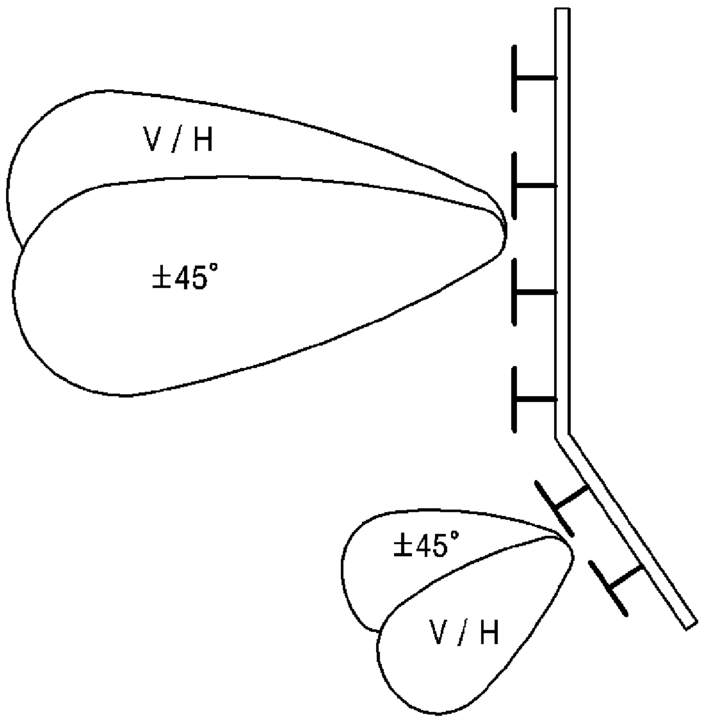

Meanwhile, as illustrated in FIG. 7*b*, the third and fourth beams formed by the dual-polarized antenna units arranged in the lower left area and the lower right area can cover a shaded area that is not covered with the first beam and the second beam formed by the antenna elements arranged in the upper right area and the upper left area. Therefore, in the lower left area and lower right area, the dual-polarized antenna units fewer than those in the upper right area and upper left area (which provide the main coverage of the antenna system) can be arranged.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

CROSS-REFERENCE TO RELATED APPLICATION

This application claims priority to Korean Patent Application Nos. 10-2021-0127532, filed on Sep. 27, 2021 and 10-2022-0110149, filed on Sep. 1, 2022 in the Korean Intellectual Property Office, the disclosures of which are incorporated herein by reference in their entirety.

What is claimed is:

1. A polarization diversity antenna system comprising:

an antenna array including a first column of dual-polarized antenna units and a second column of dual-polarized antenna units, each of the dual-polarized antenna units including a first antenna element and a second antenna element perpendicularly crossing each other, the first antenna elements in each column being conductively connected to form a first subarray, the second antenna elements in each column being conductively connected to form a second subarray; and an RF matrix branching each of RF input signals to a plurality of branch signals, selectively adjusting phases of the plurality of branch signals, and generating RF output signals provided to the first subarray of the first column, the second subarray of the first column, the first subarray of the second column, and the second subarray of the second column, and wherein when the RF output signals are radiated by the dual-polarized antenna units, a first beam with +/−45° polarizations and a second beam with 0°/90° polarizations are formed, and the first beam and the second beam are formed toward spatially different directions from each other, wherein the RF matrix is implemented with quadrature hybrid couplers (QHC) formed on a PCB, wherein the RF matrix includes:

a first QHC, a second QHC, and a third QHC, a first input port connected to a first arm of the first QHC, a second input port connected to a first arm of the second QHC, a third input port connected to a fourth arm of the third QHC, and a fourth input port connected to a second arm of the third QHC, and a first output port connected to a second arm of the first QHC, a second output port connected to a third arm of the first QHC, a third output port connected to a second arm of the second QHC, and a fourth output port connected to a third arm of the second QHC, wherein the second arm of the third QHC is connected to the fourth arm of the first QHC, and the third arm of the third QHC is connected to the fourth arm of the second QHC.

2. The polarization diversity antenna system of claim 1, wherein the first input port, the second input port, the third input port, and the fourth input port are connected to the first subarray of the first column, the first subarray of the second column, the second subarray of the first column, and the second subarray of the second column, respectively.

3. The polarization diversity antenna system of claim 1, wherein the first input port, the second input port, the third input port, and the fourth input port are each connected to RF chains supplying the RF input signals.

4. The polarization diversity antenna system of claim 1, wherein the RF matrix selectively adjusts phases of the plurality of branch signals based on a phase difference for forming the first beam and the second beam and a phase difference for determining the polarization of the first beam and the second beam.

5. The polarization diversity antenna system of claim 4, wherein a phase adjusted by the RF matrix circuit for a pair of RF input signals propagated by the first beam among the RF input signals, is defined to achieve a desired spatial direction in which the first beam is formed.

6. The polarization diversity antenna system of claim 4, wherein a phase adjusted by the RF matrix circuit for a pair of RF input signals propagated by the second beam among the RF input signals, is defined to achieve a desired spatial direction in which the second beam is formed and polarization synthesis.

7. The polarization diversity antenna system of claim 1, wherein the dual-polarized antenna units have +/−45° polarization characteristics.

8. The polarization diversity antenna system of claim 7, wherein 0°/90° polarizations of the second beam is obtained by polarization synthesis.

* * * * *